(12) United States Patent
Haikola et al.

(10) Patent No.: US 7,916,749 B2
(45) Date of Patent: Mar. 29, 2011

(54) METHOD, APPARATUS AND COMPUTER PROGRAM TO SIGNAL ADDITIONAL MODULATION SCHEME WITHOUT ADDITIONAL SIGNALLING OVERHEAD

(75) Inventors: Ville Haikola, Oulu (FI); Karri Ranta-aho, Espoo (FI); Jorma Kaikkonen, Oulu (FI); Marko Lampinen, Oulu (FI); Javier Flors-Sidro, Helsinki (FI)

(73) Assignee: Nokia Corporation, Espoo (FI)

( * ) Notice: Subject to any disclaimer, the term of this patent is extended or adjusted under 35 U.S.C. 154(b) by 272 days.

(21) Appl. No.: 12/008,302

(22) Filed: Jan. 9, 2008

(65) Prior Publication Data

US 2008/0212608 A1 Sep. 4, 2008

Related U.S. Application Data

(60) Provisional application No. 60/879,726, filed on Jan. 9, 2007.

(51) Int. Cl.
*H04J 3/16* (2006.01)
(52) U.S. Cl. ....................................................... 370/467
(58) Field of Classification Search .................. 370/342, 370/437
See application file for complete search history.

(56) References Cited

U.S. PATENT DOCUMENTS

| 2003/0123470 A1* | 7/2003 | Kim et al. ................... 370/437 |
| 2004/0028020 A1* | 2/2004 | Frederiksen et al. ......... 370/342 |
| 2008/0117873 A1 | 5/2008 | Ranta-Aho et al. ........... 370/329 |

FOREIGN PATENT DOCUMENTS

WO WO-2008/053323 A2 5/2008

OTHER PUBLICATIONS

TSG-RAN WG1 Meeting #46bis, R1-062935, Ericsson, Seoul, Korea, Oct. 9-13, 2006, Higher Order Modulation for HSPA—Impact on RAN1 ~ecifications 7.3—Scope of future FDD HSPA Evolution, 1 pg.*
"Universal Mobile Telecommunications System (UMTS); Multiplexing and channel coding (FDD) (3GPP TS 25.212 version 6.10.0 Release 6)", ETSI TS 125 212 v6.10.9 (Dec. 2006), 85 pgs.*
3GPP TSG-RAN WG1 #46, R1-062032, Qualcomm Europe, Aug. 28-Sep. 1, 2006, HS-SCCH in Support of D-TxAA, pp. 1-7.
3GPP TSG RAN WG1 Meeting #46bis, Tdoc R1-062485, Philips, Seoul, Korea Oct. 9-13, 2006, Details of HS-SCCH signaling for Rel-7 MIMO, 7 pgs.

(Continued)

*Primary Examiner* — Jason E Mattis
*Assistant Examiner* — Joey Bednash
(74) *Attorney, Agent, or Firm* — Harrington & Smith

(57) ABSTRACT

A method and apparatus are provided for jointly encoding bits containing information about an existing modulation technique or an existing antenna transmission technique in order to extend signaling to include new information about an additional modulation technique or the use of an additional antenna transmission technique without having to increase the number of bits transmitted in the signaling; and conveying the new information in unused combinations of the encoded bits. The signaling may take the form of a high speed shared control channel (HS-SCCH) that forms part of a high speed downlink packet access (HSDPA). In some embodiments, the existing modulation technique may include quadrature phase shift keying (QPSK), 16 quadrature amplitude modulation (16QAM), or some combination thereof, and the additional modulation technique may include 64 quadrature amplitude modulation (64QAM).

48 Claims, 6 Drawing Sheets

OTHER PUBLICATIONS

TSG-RAN WG1 Meeting #46bis, R1-062935, Ericsson, Seoul, Korea, Oct. 9-13, 2006, Higher Order Modulation for HSPA—Impact on RAN1 specifications 7.3—Scope of future FDD HSPA Evolution, 2 pgs.

3GPP TS 25.212, V7.5.0 (May 2007), 3rd Generation Partnership Project; Technical Specification Group Radio Access Network; Multiplexing and channel coding (FDD) (Release 7), 77 pgs.

"Universal Mobile Telecommunications System (UMTS); Multiplexing and channel coding (FDD) (3GPP TS 25.212 version 6.10.0 Release 6)", ETSI TS 125 212 V6.10.0 (Dec. 2006), 85 pgs.

"Higher Order Modulation to HSPA—impact on RAN1 specifications", TSG-RAN WG1 Meeting #46bis, R1-062935, Oct. 2006, 1 pg.

"HS-SCCH structure for MIMO and 64QAM", 3GPP TSG-RAN WG1 Meeting #47bis, R1-070179, Jan. 2007, 3 pgs.

* cited by examiner

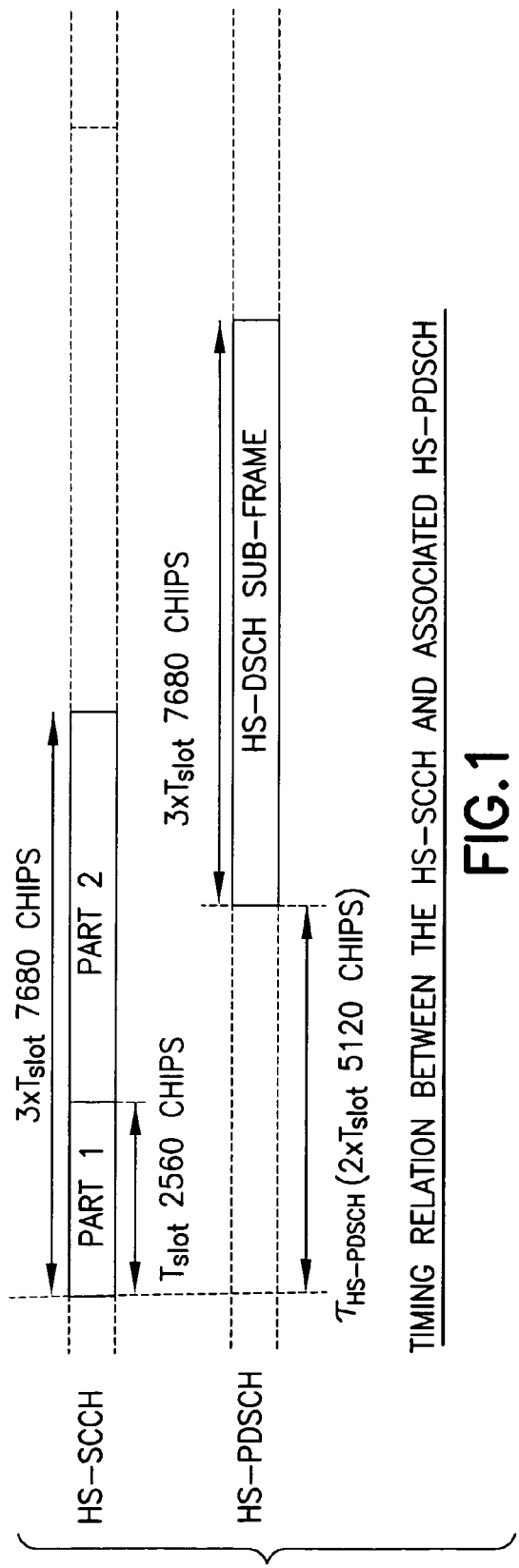
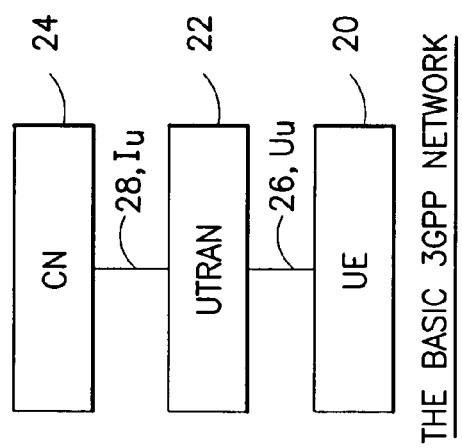

THE 3GPP NETWORK IN MORE DETAIL

METHOD, APPARATUS AND COMPUTER PROGRAM TO SIGNAL ADDITIONAL MODULATION SCHEME WITHOUT ADDITIONAL SIGNALLING OVERHEAD

PRIORITY STATEMENT

This application claims priority to U.S. Provisional Patent Application No. 60/879,726 (filed Jan. 9, 2007), the contents of which is hereby incorporated in its entirety.

TECHNICAL FIELD

These teachings generally relate to wireless mobile telecommunication systems with adaptive modulation. Particular embodiments relate to the HSDPA aspects of the $3^{rd}$ generation partnership project (3GPP of 3GPP2) where the used modulation is either QPSK or 16 QAM depending on the Node B scheduler decision.

BACKGROUND

The following abbreviations are used in the text below.

| | |
|---|---|
| HSDPA | high speed downlink packet access |
| HS-DSCH | high speed downlink shared channel |
| HS-PDSCH | high speed physical downlink shared channel |
| HS-SCCH | high speed shared control channel |
| QAM | quadrature amplitude modulation |
| QPSK | quadrature phase shift keying |
| RNC | radio network controller |
| SDMA | space division multiple access |
| UE | user equipment |

The 3GPP Release-5/6/7 specifications define HSDPA with adaptive modulation where the used modulation is either QPSK or 16QAM depending on the Node B scheduler decision. See for example 3GPP TS 25.212 "Multiplexing and channel coding". Recently the discussion on introducing also the possibility to use 64QAM with HSDPA has emerged in 3GPP. At the same time 3GPP is specifying a MIMO (multiple input-multiple output) multiantenna technique for HSDPA MIMO requiring some redesigning for the HSDPA related control channels.

The current HS-SCCH structure used to inform the format of the actual high speed downlink shared channel (HS-DSCH) transmission (including the used modulation) is split into two parts. Part 1 contains 8 bits, 7 bits to inform the used high speed physical downlink shared channel (HS-PDSCH) codes for the HS-DSCH transmission and one bit (QPSK/16QAM) informing the used modulation on those HS-PDSCH codes. Part 2 contains further information such as transport block size, hybrid automatic repeat request (HARQ) information, etc.

The high speed shared control channel (HS-SCCH) transmission starts 5120 chips earlier than the HS-DSCH transmission in order to allow the user equipment (UE) receiver to get the $1^{st}$ part of the HS-SCCH before the HS-DSCH reception starts and thus know in advance the codes and modulation used on the HS-DSCH, as best shown in FIG. 1.

With HSDPA MIMO the intention is further to add at least two bits of the antenna weights used for the HS-DSCH transmission to Part 1 for giving also this MIMO specific information to the receiver. Also, one bit will be added to indicate the number of streams used i.e. single-stream or dual-stream transmission. The dual-stream transmission consists of a primary stream and a secondary stream. The modulation type (QPSK/16QAM/64QAM) for the secondary stream is always equal to or lower than the modulation of the primary stream. However, the first problem is how to add a new modulation (64QAM) indication to the part 1 of the HS-SCCH.

Moreover, multi-stream transmission enables the use of space division multiple access (SDMA) methods, where simultaneous data streams can be transmitted to different UEs. However, there is a second problem—how to inform different UEs that SDMA transmission is ongoing, because this knowledge is beneficial in the receiver design.

An example of a working assumption for defining the new HS-SCCH structure for MIMO operation may be seen at document R1-062485 entitled "Details of HS-SCCH signalling for Rel-7 MIMO", from 3GPP TSG RAN WG1 Meeting #46 bis (Seoul, Korea, 9-13 Oct. 2006 by Philips).

One solution to the problem is to do as was done with the antenna weight bits with MIMO, i.e. make room for one additional bit to the part 1 by reducing the error correction coding of the part 1. See, for example, document R1-062935 entitled "Higher Order Modulation for HSPA—Impact on RAN1 specifications", from that same 3GPP RAN1 meeting and by Ericsson.

Moreover, another prior art solution to the problem is to introduce one extra bit to signal SDMA operation. See, for example, document R1-062032 entitled "HS-SCCH in support of D-TxAA", from that same 3GPP RAN1 meeting and by Qualcomm Europe.

There is a need in the art for a solution to these problems without substantially increasing the signalling overhead as in the above proposed solutions.

SUMMARY

According to an embodiment of the invention is a method that includes in a first case, sending a first part of a first control message and thereafter sending a first transmission using a first modulation. The first part of the first control message includes a modulation indicator that indicates the first modulation and a first channelization code set indicator that indicates channelization codes for the first transmission. Further in the method, a second case includes sending a first part of a second control message and thereafter sending a second transmission using a second modulation. The first part of the second control message includes a modulation indicator that indicates other than the first modulation, another modulation indicator that specifically indicates the second modulation, and a second channelization code set indicator that indicates channelization codes for the second transmission. The second channelization code set indicator is shorter than the first channelization code set indicator by the size of the another modulation indicator.

According to another embodiment of the invention is a memory embodying a program of machine-readable instructions executable by a digital data processor to perform actions directed toward specifying adaptive modulation for transmission. In this embodiment the actions include for a first case sending a first part of a first control message and thereafter sending a first transmission using a first modulation. The first part of the first control message includes a modulation indicator that indicates the first modulation and a first channelization code set indicator that indicates channelization codes for the first transmission. The actions further includes for a second case sending a first part of a second control message and thereafter sending a second transmission using a second modulation. The first part of the second control message includes a modulation indicator that indicates other than the first modulation, another modulation indicator that specifically indicates a second modulation, and a second channelization code set indicator that indicates channelization codes for the second transmission. The second channelization code set indicator is shorter than the first channelization code set indicator by the size of the another modulation indicator.

According to another embodiment of the invention is an apparatus that includes a transmitter and a modulator coupled to a processor such that in a first case the transmitter is adapted to send a first part of a first control message and thereafter to modulate and send a first transmission using a first modulation. The first part of the first control message includes a modulation indicator that indicates the first modulation and a first channelization code set indicator that indicates channelization codes for the first transmission. The apparatus is further configured in a second case such that the transmitter is adapted to send a first part of a second control message and thereafter to modulate and send a second transmission using a second modulation. The first part of the second control message includes a modulation indicator that indicates other than the first modulation, another modulation indicator that specifically indicates the second modulation, and a second channelization code set indicator that indicates channelization codes for the second transmission. The second channelization code set indicator is shorter than the first channelization code set indicator by the size of the another modulation indicator.

According to another embodiment of the invention is an apparatus that includes means for arranging a control message according to a first case and according to a second case, and means for sending the control message. For the first case the means for arranging and the means for sending are for sending a first part of a first control message and thereafter for sending a first transmission using a first modulation, where the first part of the first control message includes a modulation indicator that indicates the first modulation and a first channelization code set indicator that indicates channelization codes for the first transmission. For the second case the means for arranging and the means for sending are for sending a first part of a second control message and thereafter for sending a second transmission using a second modulation, where the first part of the second control message includes a modulation indicator that indicates other than the first modulation, another modulation indicator that specifically indicates the second modulation, and a second channelization code set indicator that indicates channelization codes for the second transmission. The second channelization code set indicator is shorter than the first channelization code set indicator by the size of the another modulation indicator. In a particular embodiment of this aspect of the invention, the means for arranging includes a digital processor and the means for sending includes a transmitter, and further the first modulation is QPSK and other than the first modulation is QAM and the another modulation scheme indicator selects between 16QAM and 64QAM. In a further particular embodiment each of the modulation indicators is one bit, the first channelization code set indicator is seven bits and for the second case the means for arranging shortens the second channelization code set indicator by a least significant bit to six bits to make room in the first part of the second control message for the another modulation indicator.

According to another embodiment of the invention is a method that includes, in a first case, determining a first modulation from a modulation indicator of a first part of a received first control message and determining channelization codes for a first transmission from a first channelization code set indicator of the first part of the first control message, and demodulating the received first transmission according to the determined first modulation. Further in this method in a second case, is determining other than the first modulation from a modulation indicator of a first part of a received second control message, determining a specific second modulation that is other than the first modulation from another modulation indicator of the first part of the second control message, determining channelization codes for a second transmission from a second channelization code set indicator of the first part of the second control message, and demodulating the received second transmission according to the determined specific second modulation. The second channelization code set indicator is shorter than the first channelization code set indicator by the size of the another modulation indicator.

According to another embodiment of the invention is a memory embodying a program of machine-readable instructions executable by a digital data processor to perform actions directed toward specifying adaptive modulation for transmission. In this embodiment of the invention the actions include, in a first case, determining a first modulation from a modulation indicator of a first part of a received first control message and determining channelization codes for a first transmission from a first channelization code set indicator of the first part of the first control message, and demodulating the received first transmission according to the determined first modulation. The actions include, in a second case, determining other than the first modulation from a modulation indicator of a first part of a received second control message, determining a specific second modulation that is other than the first modulation from another modulation indicator of the first part of the second control message, determining channelization codes for a second transmission from a second channelization code set indicator of the first part of the second control message, and demodulating the received second transmission according to the determined specific second modulation. The second channelization code set indicator is shorter than the first channelization code set indicator by the size of the another modulation indicator.

According to another embodiment of the invention is an apparatus that includes a receiver coupled to a processor that are adapted in a first case to determine a first modulation from a modulation indicator of a first part of a received first control message and to determine channelization codes for a first transmission from a first channelization code set indicator of the first part of the first control message, and to demodulate the received first transmission according to the determined first modulation. The receiver and processor are adapted in a second case to determine other than the first modulation scheme from a modulation indicator of a first part of a received second control message, to determine a specific second modulation that is other than the first modulation from another modulation indicator of the first part of the second control message, to determine channelization codes for a second transmission from a second channelization code set indicator of the first part of the second control message, and to demodulate the received second transmission according to the determined specific second modulation. The second channelization code set indicator is shorter than the first channelization code set indicator by the size of the another modulation indicator.

According to another embodiment of the invention is an apparatus that includes means for receiving coupled to processing means which are adapted in a first case for determining a first modulation from a modulation indicator of a first part of a received first control message and for determining channelization codes for a first transmission from a first channelization code set indicator of the first part of the first control message and for demodulating the received first transmission according to the determined first modulation. The means for receiving and processing means are adapted in a second case for determining other than the first modulation from a modulation indicator of a first part of a received second control message, for determining a specific second modulation that is other than the first modulation from another modulation indicator of the first part of the second control message, for determining channelization codes for a second transmission from a second channelization code set indicator of the first part of the second control message, and for demodulating the received second transmission according to the determined specific second modulation, where the second channelization code set indicator is shorter than the first channelization code set indicator by the size of the another modulation indicator. In a particular embodiment of this aspect of the invention, the receiving means includes a receiver, the processing means includes a processor, the first part of the first control message and the first part of the second control message are of equal lengths, the first modulation is QPSK and other than the first modulation is QAM, and the another modulation indicator selects between 16QAM and 64QAM.

The foregoing and other objects, features and advantages of the present invention will become more apparent in light of the following detailed description of exemplary embodiments thereof.

BRIEF DESCRIPTION OF THE DRAWINGS

The Figures are not drawn to scale and include the following:

FIG. 1 shows a known timing relation between the HS-SCCH and the associated HS-PDSCH.

FIGS. 2a and 2b show block diagrams of the UMTS packet network architecture according to some embodiments of the preset invention, and FIG. 2c shows details of certain of the devices of FIG. 2b.

DETAILED DESCRIPTION

Figures 2B, 2C:
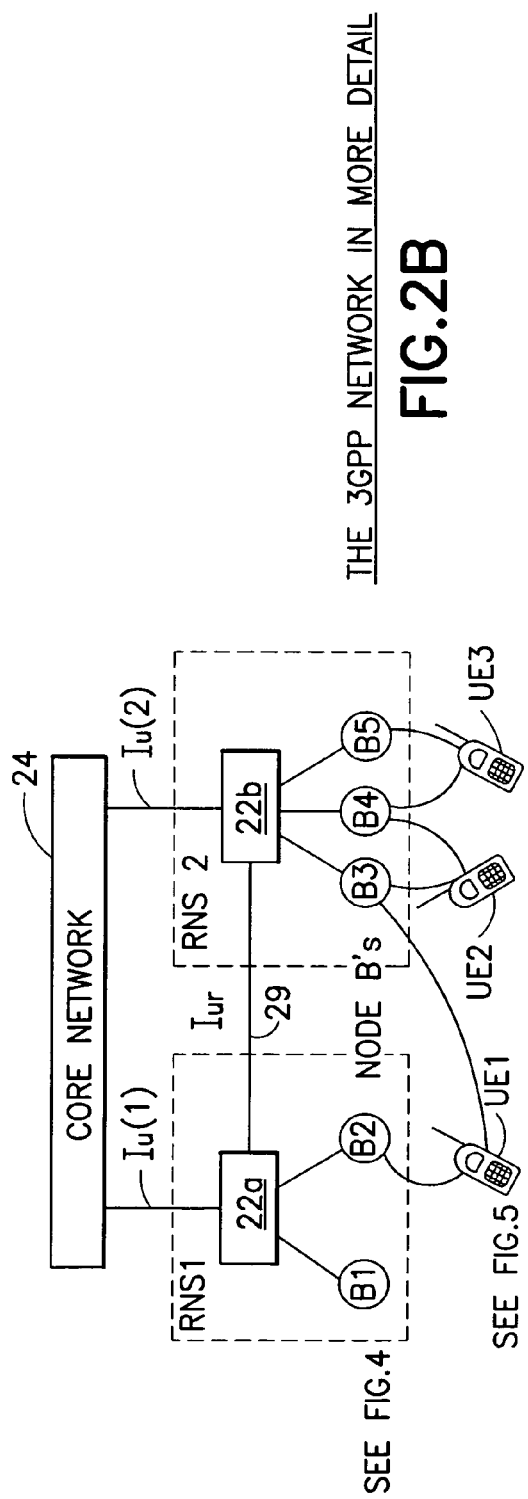

FIGS. 2a and 2b show diagrams of the UMTS packet network architecture, according to some embodiments of the present invention. In FIG. 2a, the UMTS packet network architecture includes the major architectural elements of user equipment (UE) 20, UMTS terrestrial radio access network (UTRAN) 22, and core network (CN) 24. The UE (also referred to as a "terminal" herein) does not itself form part of the wireless network 22 but is interfaced to the UTRAN over a radio (Uu) interface 26, while the UTRAN interfaces to the core network (CN) over a (wired) Iu interface 28. FIG. 2b shows some further details of the architecture, particularly the UTRAN, which includes multiple radio network subsystems (RNSs) RRNS1, RNS2, each of which contains at least one controller of network access nodes 22a, 22b such as a radio network controller (RNC) (named variously in different radio technologies, such as for example mobility management entity MME or gateway GW). In operation, each RNC may be connected to multiple Node Bs B1 through B5 which are the UMTS counterparts to GSM (global system for mobile communications) base stations. Each Node B may be in radio contact with multiple UEs via the radio interface (Uu) 26 shown in FIG. 2b. A given UE may be in radio contact with multiple Node Bs even if one or more of the Node Bs are connected to different RNCs. For instance, a UE1 in FIG. 2b may be in radio contact with Node B2 of RNS1 and Node B3 of RNS2 where Node B2 and Node B3 are neighboring Node Bs. This may occur, for example, when the UE1 is in a handover situation and there is a change in the connection from one Node B to another. The RNCs of different RNSs may be connected by an Iur interface 29 which allows mobile UEs to stay in contact with both RNCs while traversing from a cell belonging to a Node B of one RNC to a cell belonging to a Node B of another RNC.

FIG. 2c illustrates a simplified block diagram of various electronic devices form FIG. 2b that are suitable for use in practicing the exemplary embodiments of this invention. In FIG. 2c a wireless network 22 is adapted for communication between a UE 30 and a Node B 32 (termed an e-Node B in some radio access technologies). The network 22 may include a gateway GW/serving mobility entity MME/radio network controller RNC 32 or other radio controller function known by various terms in different wireless communication systems. The UE 30 includes a data processor (DP) 30A, a memory (MEM) 30B that stores a program (PROG) 30C, and one or more suitable radio frequency (RF) transceivers 30D (two shown) coupled to one or more antennas 30E (two shown) for bidirectional wireless communications over one or more wireless links 26 with the Node B 32.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 32 also includes a DP 32A, a MEM 32B, that stores a PROG 32C, and one or more suitable RF transceivers 32D (two shown) coupled to one or more antennas 32E (two shown). The Node B 32 may be coupled via a data path 36 (e.g., Iub or S1 interface) to the serving or other GW/MME/RNC 34. The GW/MME/RNC 34 includes a DP 34A, a MEM 34B that stores a PROG 34C, and a suitable modem and/or transceiver (not shown) for communication with the Node B 32 over the Iub link 36.

Also within the Node B 32 is a scheduler 32F that schedule the various UEs under its control according to these teachings. Generally, the Node B 32 of a WCDMA or an LTE system is fairly autonomous in its scheduling and need not coordinate with the GW/MME/RNC 34 excepting during handover of one of its UEs to another Node B as noted above.

At least one of the PROGs 30C, 32C and 34C is assumed to include program instructions that, when executed by the associated DP, enable the electronic device to operate in accordance with the exemplary embodiments of this invention, as detailed above. Inherent in the DPs 30A, 32A, and 34A is a clock to enable synchronism among the various apparatus for transmissions and receptions within the appropriate time intervals and slots required, as the scheduling grants and the granted resources/subframes are time dependent.

The PROGs 30C, 32C, 34C may be embodied in software, firmware and/or hardware, as is appropriate. In general, the exemplary embodiments of this invention may be implemented by computer software stored in the MEM 30B and executable by the DP 30A of the UE 30 and similar for the other MEM 32B and DP 32A of the Node B 32, or by hardware, or by a combination of software and/or firmware and hardware in any or all of the devices shown.

In general, the various embodiments of the UE 30 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 30B, 32B and 34B may be of any type suitable to the local technical environment and may be implemented using any suitable data storage technology, such as semiconductor-based memory devices, magnetic memory devices and systems, optical memory devices and systems, fixed memory and removable memory. The DPs 30A, 32A and 34A may be of any type suitable to the local technical environment, and may include one or more of general purpose computers, special purpose computers, microprocessors, digital signal processors (DSPs) and processors based on a multi-core processor architecture, as non-limiting examples.

In accordance with an embodiment of the invention, the Node Bs (see also FIG. 4) cooperate with UE1, UE2 or UE3 and extend the HS-SCCH signaling so as to include information of 64QAM and the use of SDMA (multi user MIMO) without having to increase the number of bits transmitted on the HS-SCCH. This is done by jointly encoding the bits for modulation and number of streams and conveying the new information using the unused combinations. In effect, embodiments of the invention provide a new technique how to signal multi-user MU-MIMO/SDMA transmission and higher order modulation (64QAM) using 2 bits in the control channel bitfield for HSDPA/HS-DSCH (which is signaled on HS-SCCH). By using this new method, there is no need to change the HS-SCCH format. Only the interpretation of the content of the HS-SCCH is changed.

Figure 3:
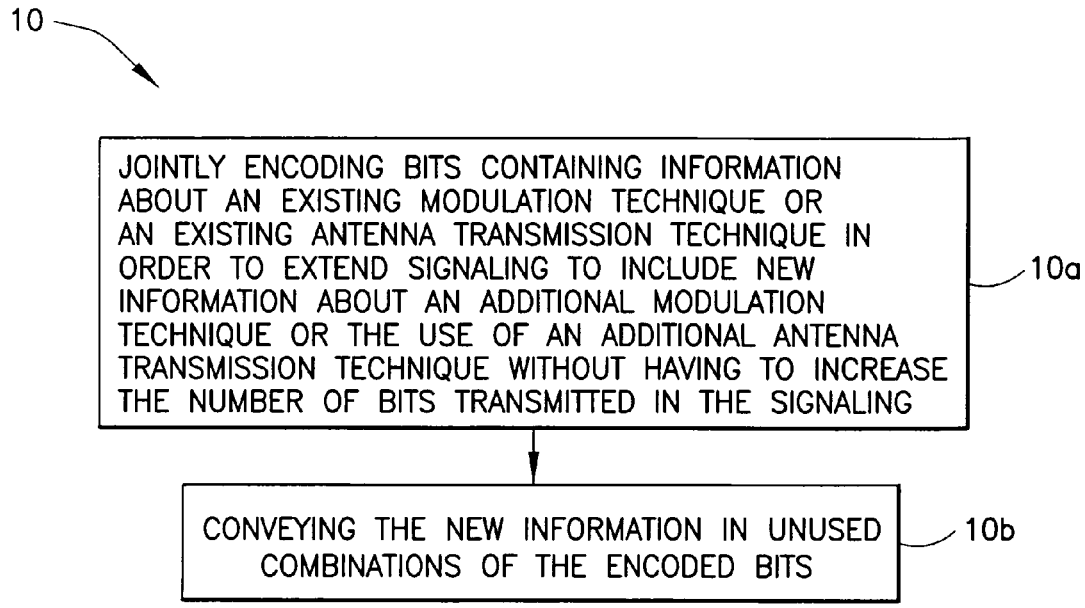
FIG. 3 shows a flowchart showing steps according to some embodiments of the preset invention.

FIG. 3 shows a flowchart generally indicated as 10 setting forth the basic steps 10a, 10b according to some embodiments of the preset invention.

In operation, an embodiment of the invention is to check the number of streams indication bit, and if only a single-stream is used, then the unused other stream modulation scheme bit is interpreted as additional modulation info bit for the single-stream or as an indication of an SDMA operation. For example, if the number of streams (NS) bit indicates that a single-stream is used, then the other stream modulation scheme (MS) bit is interpreted as follows:

| Primary stream MS bit | Other stream MS bit | Indicated modulation |
|---|---|---|
| 0 | 0 | QPSK |
| 0 | 1 | 16QAM |
| 1 | 0 | 64QAM |
| 1 | 1 | 128QAM |

Alternatively, if a dual-stream transmission is used, then the restricted combination of modulation scheme bits indicates that 64QAM will be used for primary stream. The 64QAM usage for secondary stream can be indicated by interpreting one code information bit as 16QAM/64QAM selection. For example, if the number of streams (NS) bit indicates that the dual-stream is used, then the modulation scheme (MS) bits are interpreted as follows:

| Primary stream MS bit | Secondary stream MS bit | Indicated modulation for primary stream | Indicated modulation for secondary stream |
|---|---|---|---|
| 0 | 0 | QPSK | QPSK |
| 0 | 1 | 64QAM | 16QAM/64QAM |
| 1 | 0 | 16QAM | QPSK |
| 1 | 1 | 16QAM | 16QAM |

Now the restricted bit combination (0 1) indicates 64QAM for the primary stream, and the modulation usage for the secondary stream depends on one code information bit.

Moreover, the solution to the SDMA indication problem is similar to the single stream solution, i.e. the other stream modulation scheme (MS) bit is interpreted as follows:

| Primary stream MS bit | Other stream MS bit | SDMA transmission | Indicated modulation |
|---|---|---|---|
| 0 | 0 | Off | QPSK |
| 0 | 1 | On | QPSK |
| 1 | 0 | Off | 16QAM |
| 1 | 1 | On | 16QAM |

Figure 4:
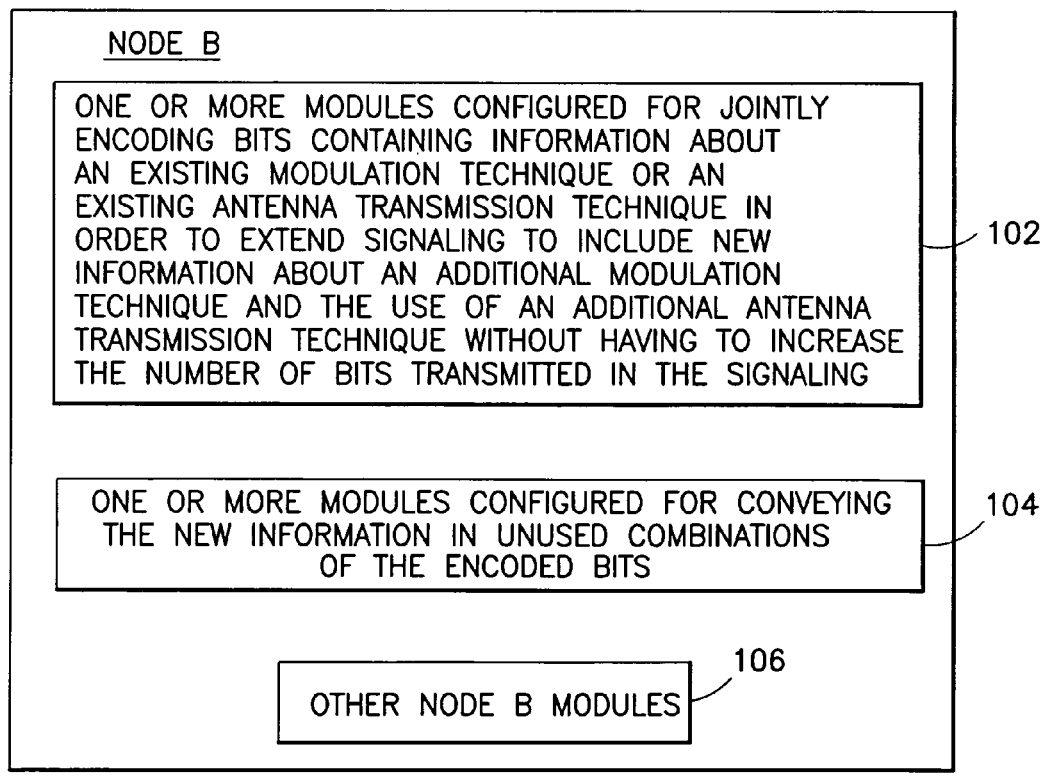
FIG. 4 shows a block diagram of a network node B according to some embodiments of the present invention.

FIG. 4: Network Node 100. FIG. 4 shows, by way of example, a network node generally indicated as 100 according to the present invention that may form part of the RNS, RNC, node Bs or some combination thereof consistent with that shown in FIGS. 2a and 2b, and consistent with that shown and described herein. The scope of the invention is not intended to be limited to where the functionality of the network node is implemented in the network. The network node B 100 includes one or more modules 102 and 104, as well as other node B modules 106.

Consistent with that shown and described herein, the one or more modules 102 may be configured for jointly encoding bits containing information about an existing modulation technique or an existing antenna transmission technique in order to extend signaling to include new information about an additional modulation technique or the use of an additional antenna transmission technique without having to increase the number of bits transmitted in the signaling; while the one or more modules 104 may be configured for conveying the new information in unused combinations of the encoded bits.

By way of example, the functionality of the modules 102 and 104 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 102 and 104 being a stand alone module in the combination with other circuitry for implementing another module.

The other Node B modules 106 and the functionality thereof are known in the art, do not form part of the underlying invention per se, and are not described in detail herein. For example, the other Node B modules 206 may include one or more other modules in the RNS, RNC, Node B or some combination thereof, which are known in the art and not described herein.

Figure 5:
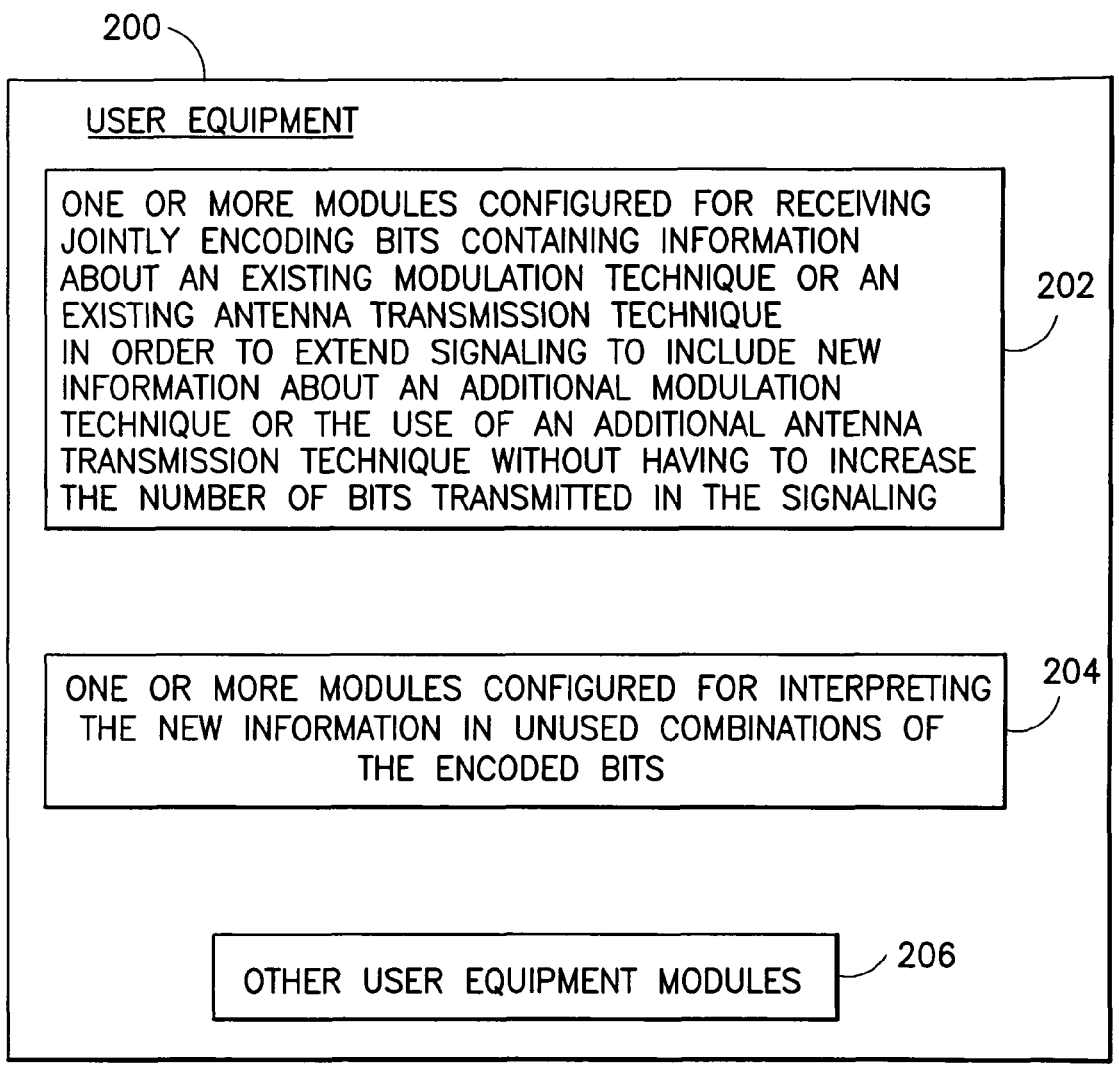
FIG. 5 shows a block diagram of user equipment or a terminal according to an embodiment of the present invention.

FIG. 5: Terminal or UE 200. FIG. 5 shows, by way of example, a terminal or UE generally indicated as 200 according to the present invention that may form part of the network shown in FIGS. 2a and 2b, consistent with that shown and described herein. The terminal or UE includes one or more modules 102 and 204, as well as and other user equipment modules 206.

Consistent with that shown and described herein, the one or more modules 202 may be configured for receiving jointly encoded bits containing information about an existing modulation technique or an existing antenna transmission technique in order to extend signaling to include new information about an additional modulation technique or the use of an additional antenna transmission technique without having to increase the number of bits transmitted in the signaling; while the one or more modules 204 may be configured for interpreting the new information in unused combinations of the encoded bits.

By way of example, the functionality of the module 202 and 204 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 102 being a stand alone module in the combination with other circuitry for implementing another module.

The other UE modules 206 and the functionality thereof are known in the art, do not form part of the underlying invention per se, and are not described in detail herein. For example, the other UE modules 206 may include other modules such as a UMTS subscriber identity module (USIM) and mobile equipment (ME) module, which are known in the art and not described herein.

A Further Implementation. The following is a further implementation in which some provisions take place in the signalling structures for the 64QAM operation with MIMO.

In addition to the HS-SCCH defined for Rel-5 HSDPA RAN1, there is a need to define a HS-SCCH supporting 64QAM, a HS-SCCH structure supporting MIMO and possibly provide also a support for MIMO with 64QAM on the HS-SCCH structure defined for MIMO.

This implementation outlines a new technique for HS-SCCH structures that would support all the 4 combinations without explicitly defining a separate HS-SCCH structure for each mode of operation separately. The technique maintains the Part1/Part2 separation of the HS-SCCH and has two different formats for Part2 in MIMO mode, one for single and one for dual stream transmission.

HS-SCCH Design

The design assumptions and targets. The basic design should be able to support all the combinations, MIMO operation, no MIMO operation and operation with and without 64QAM with only two HS-SCCH structures, one for MIMO and one for no MIMO case. The target is also to do this in a backwards compatible manner.

It is further assumed that the usage of MIMO and/or 64QAM is separately signaled to the UE if both the UE and the Node B support these features and the network decides to activate them. This signalling is the basis for the UE to know how to receive the HS-PDSCH. It is further identified that 64QAM support only impacts the Part1.

Finally, 64QAM signalling should not cost anything in performance for the 16QAM MIMO operation.

HS-SCCH for non-MIMO with/without 64QAM. Based on the aforementioned, one may take the Rel-5 HS-SCCH as a basis for 64QAM support. Part2 may remain the same regardless of 64QAM support and only the indication of 64QAM modulation needs to be included in the Part1.

This technique of allowing to have the same number of information bits and thus the same coding and rate matching leading to the same HS-SCCH performance is to reinterpret the channelization code set information bits when 64QAM is configured to the link and QAM transmission is indicated by the modulation scheme information bit, shown by way of example, as follows:

TABLE 1

HS-SCCH Part1 structure for non-MIMO operation

| | Modulation scheme information | | | Used |
|---|---|---|---|---|
| | QPSK/QAM | 16/64QAM | Code Set Info | Modulation |
| 64QAM not configured | 0 | N/A | 7 bits (Rel-5) | QPSK |
| | 1 | N/A | 7 bits (Rel-5) | 16QAM |
| 64QAM configured | 0 | N/A | 7 bits (Rel-5) | QPSK |
| | 1 | 0* | 6 bits[1] | 16QAM |
| | 1 | 1* | 6 bits[1] | 64QAM |

[1]The LSB fixed to 1 and not signalled leading to available number of codes {1, 3, 5, 7, 9, 11, 13, 15}

HS-SCCH Part2 structure for non-MIMO operation would be as defined for Rel-5 regardless of whether 64QAM is configured or not.

Moreover, the aforementioned HS-SCCH Part1 structure is set forth in Table 1 by way of example as one possible mapping and/or implementation of the present invention. However, the scope of the invention is also intended to include other possible mappings and/or implementations either now known or later developed in the future. For example, embodiments are envisioned having a mapping of, e.g., 1, 3, 5, 7, 10, 12 13 and 15.

Figure 6:
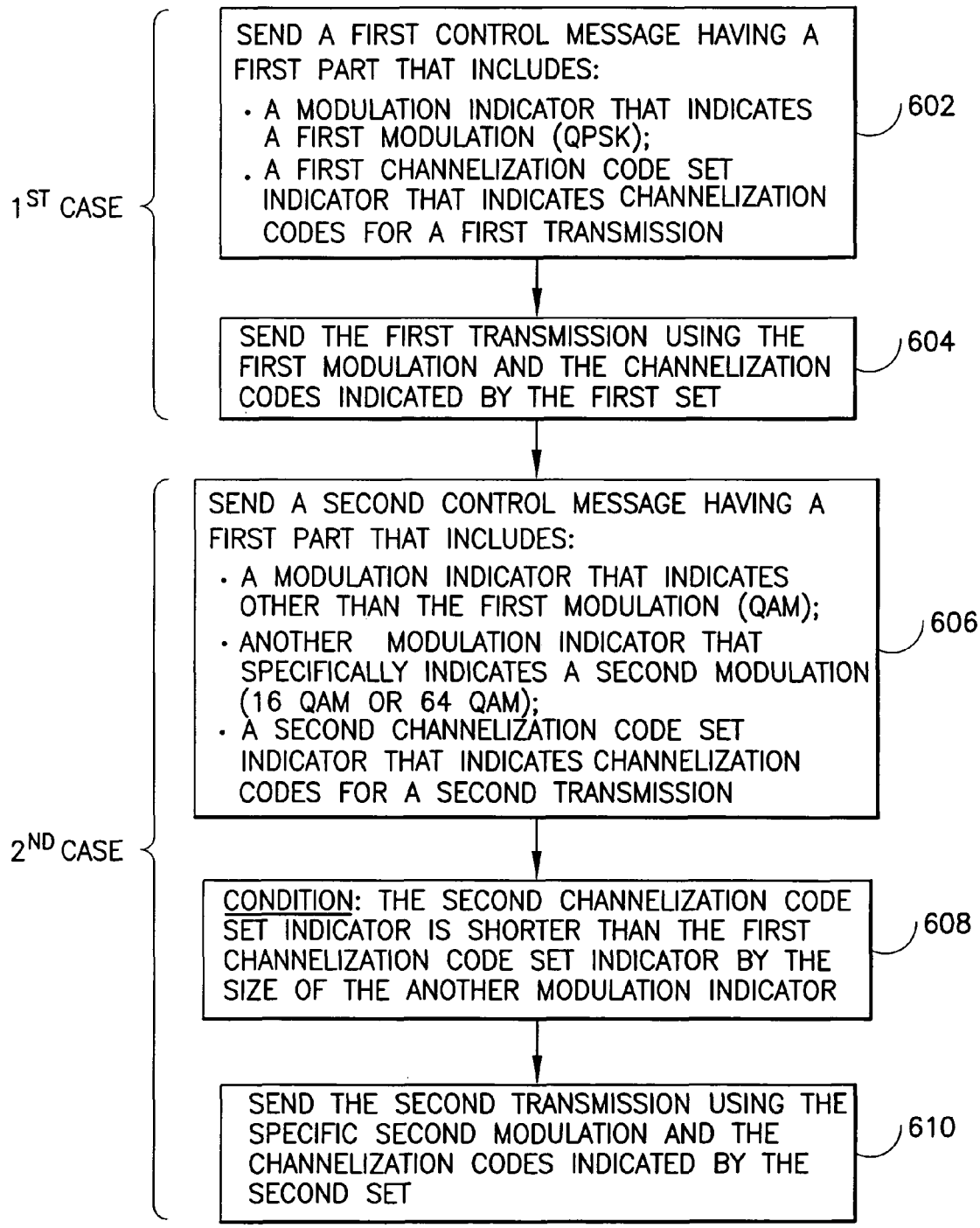
FIG. 6 is a process flow diagram illustrating steps according to an embodiment of the invention from the network perspective.

FIG. 6 is a process flow diagram showing an embodiment of the invention from the perspective of the Node B, conveniently divided into first and second cases that are meant to run sequentially. At block 602 the Node B sends a first control message. In a first part of that first control message there is a modulation indicator that indicates a first modulation such as QPSK, and a first channelization code set indicator that indicates a channelization code for a first transmission. At block 604 that first transmission is sent, and it is modulated with the first modulation and uses the channelization codes identified by the first channelization code set indicator. The second case begins at block 606, where the Node B sends a second control message which has in its first part a modulation indicator that indicates other than the first modulation (e.g., QAM), an additional modulation indicator that selects between variances of the 'other than the first modulation' (e.g., selects between 16QAM and 64QAM), and a second channelization code set indicator that indicates a channelization code for a second transmission. A condition is stated at block 608: the second channelization code set indicator is shorter than the first channelization code set indicator by the length of the 'another modulation indicator', which in an exemplary embodiment is one bit since the 'another modulation indicator' selects only between 16QAM and 64QAM. At block 610 then, that second transmission is sent using the specific modulation selected by the 'another modulation indicator', and using channelization codes associated with the second channelization code set indicator.

Figure 7:
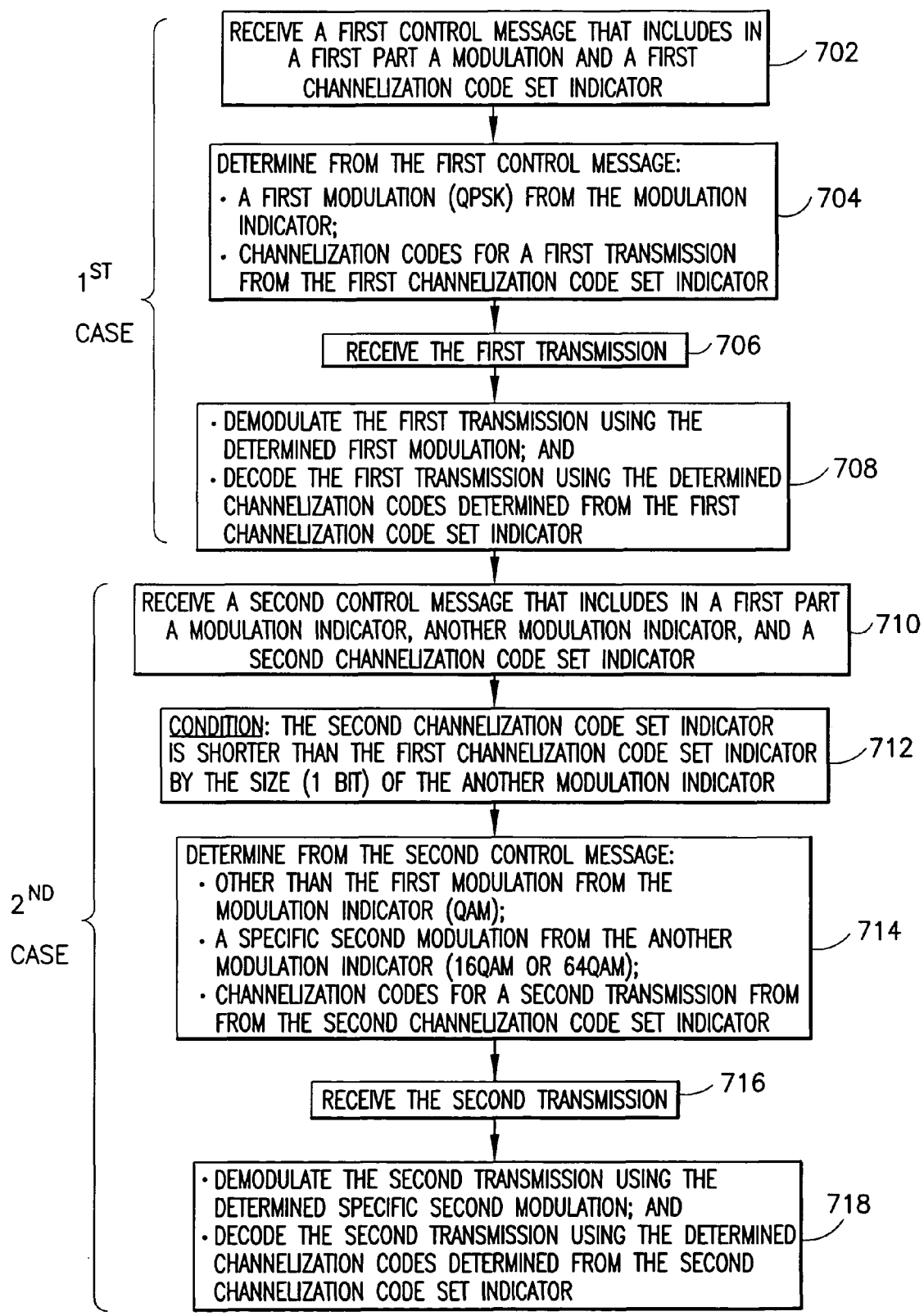
FIG. 7 is a process flow diagram illustrating steps according to an embodiment of the invention from the perspective of a user equipment.

FIG. 7 is similar to FIG. 6 but from the perspective of the user equipment/mobile terminal. At block 702 the mobile apparatus receives a first control message. In a first part of that first control message there is a modulation indicator and a first channelization code set indicator. At block 704 the user equipment determines from the received modulation indicator a first modulation (e.g., QPSK) and from the first channelization code set indicator the channelization codes for a first transmission. At block 706 that first transmission is received. At block 708 the received first transmission is demodulated using the determined first modulation, and decoded using the channelization codes that were determined from the first channelization code set indicator. The second case begins at block 710, where the user equipment receives a second control message which has in its first part a modulation indicator, an additional modulation indicator, and a second channelization code set indicator. A condition of those items of the second control message (first part of it) is stated at block 712: the second channelization code set indicator is shorter than the first channelization code set indicator by the length of the 'another modulation indicator', which in an exemplary embodiment similar to that of FIG. 6 is one bit since the 'another modulation indicator' selects only between 16QAM and 64QAM. Having received the second control message, the user equipment then determines at block 714 an 'other than the first modulation' (e.g., QAM) from the modulation indicator of the second control message, determines a specific second modulation from the 'another modulation indicator' (e.g., 16QAM or 64QAM), and determines a channelization code for a second transmission from the second channelization code set indicator. At block 716 the user equipment receives that second transmission, and at block 718 the user equipment demodulates the second transmission using the determined second modulation, and decodes the second transmission using the channelization code that was determined from the second channelization code set indicator.

HS-SCCH for MIMO without 64QAM. Based on the aforementioned, one may first implement Part1 structure optimized for supporting MIMO without 64QAM and then extend that structure to take the possible 64QAM introduction into account. As the rank indication and antenna weight information bits increases the number of bits of Part1 already by almost 40% we try to limit the additional bits of Part1 to these three.

TABLE 2

HS-SCCH Part1 structure for MIMO operation without 64QAM

| Rank | Modulation1 | Modulation2 | Code Set Info | Antenna weight | Used modulation |
|---|---|---|---|---|---|
| 0 | 0 | N/A | 7 bits (Rel-5) | 2 bits | QPSK |
| 0 | 1 | N/A | 7 bits (Rel-5) | 2 bits | 16QAM |
| 1 | 0 | N/A | 7 bits (Rel-5) | 2 bits | QPSK/QPSK |
| 1 | 1 | 0 | 6 bits[1] | 2 bits | 16QAM/ QPSK |
| 1 | 1 | 1 | 6 bits[1] | 2 bits | 16QAM/ 16QAM |

[1]The LSB would not be signalled and would be fixed to 1 leading to available number of codes {1, 3, 5, 7, 9, 11, 13, 15}

In case of MIMO operation the Part2 structure needs to be redefined to support dual-stream operation and in a single stream case the larger space for addressing HARQ processes Moreover, the aforementioned HS-SCCH Part1 structure for MIMO operation is set forth in Table 2 by way of example as one possible mapping and/or implementation of the present invention. However, the scope of the invention is also intended to include other possible mappings and/or implementations either now known or later developed in the future. For example, embodiments are envisioned having a mapping having start codes of {1, 2, 3, 4, 5, 6, 7, 8} and the # of codes as {8, 9, 10, 11, 12, 13, 14, 15}.

TABLE 3

HS-SCCH Part2 structure for MIMO operation

| | TrBlk size | HARQ ID | RV and Constellation | NDI | CRC/UE ID | Total |
|---|---|---|---|---|---|---|
| Rel-5 | 6 bits | 3 bits | 3 bits | 1 bit | 16 bits | 29 bits |
| Single stream | 6 bits | 4 bits | 2 bits[1] | | 16 bits | 28 bits |
| Dual stream | 2 × 6 bits | 2 × 3 bits[2] | 2 × 2 bits[1] | | 16 bits | 38 bits |

[1]RV, Constellation version and NDI can be jointly coded to a 2-bit HARQ transmission format
[2]Primary stream always transmitting to processes 0, ..., 7, secondary stream always transmitting to processes 8, ..., 15

The same format for Part2 can be used also if 64QAM is supported.

HS-SCCH for MIMO with 64QAM. The Part1 format for MIMO without 64QAM can be easily extended to support also 64QAM.

TABLE 4

HS-SCCH Part1 structure for MIMO operation with 64QAM configured

| Rank | Modulation1 | Modulation2 | Code Set Info | Antenna weight | Used modulation |
|---|---|---|---|---|---|
| 0 | 0 | N/A | 7 bits | 2 bits | QPSK |
| 0 | 10 | N/A | 6 bits[1] | 2 bits | 16QAM |
| 0 | 11 | N/A | 6 bits[1] | 2 bits | 64QAM |
| 1 | 0 | 0 | 6 bits[1] | 2 bits | QPSK/QPSK |
| 1 | 10 | 0 | 5 bits[2] | 2 bits | 16QAM/QPSK |
| 1 | 10 | 1 | 5 bits[2] | 2 bits | 16QAM/16QAM |
| 1 | 11 | 0 | 5 bits[2] | 2 bits | 64QAM/QPSK |
| 1 | 11 | 10 | 4 bits[3] | 2 bits | 64QAM/16QAM |
| 1 | 11 | 11 | 4 bits[3] | 2 bits | 64QAM/64QAM |

[1]The LSB would not be signalled and would be fixed to 1 leading to available number of codes {1, 3, 5, 7, 9, 11, 13, 15}
[2]Available start codes: {1, 2, 3, 4, 5, 6, 7, 8}, available number of codes: {8, 10, 12, 15}
[3]Available start codes: {1, 3, 5, 7}, available number of codes: {8, 10, 12, 15}

Conclusions. This implementation for Rel-7 HS-SCCH supports MIMO and 64QAM both separately and together by having principally only two different HS-SCCHs with both having a different interpretation depending on whether or not 64QAM is configured.

Embodiments of this invention jointly encode bits containing information about an existing modulation technique or an existing antenna transmission technique in order to extend signaling to include new information about an additional modulation technique or the use of an additional antenna transmission technique, without having to increase the number of bits transmitted in the signaling; and conveying the new information in unused combinations of the encoded bits.

The signaling may take the form of a high speed shared control channel (HS-SCCH) that forms part of a high speed downlink packet access (HSDPA).

In some embodiments, the existing modulation technique may include quadrature phase shift keying (QPSK), 16 quadrature amplitude modulation (16QAM), or some combination thereof, and the additional modulation technique may include 64 quadrature amplitude modulation (64QAM).

The existing antenna transmission technique may include single-stream or dual-stream transmission, and the additional antenna transmission technique may include the use of space division multiple access methods using a multiple input and multiple output (MIMO) technique.

In operation, the number of data streams is checked, and if there is only one data stream, then an unused other stream modulation scheme bit is interpreted as an additional modulation information bit for single-stream or as an indication of a space division multiple access operation. Alternatively, if a dual data stream transmission is used, then a restricted combination of modulation scheme bits indicates that the new modulation technique will be used for the primary stream. The modulation usage for the secondary stream may be indicated by interpreting one code information bit as either one modulation scheme or another.

Embodiments of the invention may be implemented in apparatus that may take the form of either user equipment or terminal, a network node, such as a Node B, a network or system, a computer program product or some combination thereof.

For example, the network node B may feature one or more modules configured for jointly encoding bits containing information about an existing modulation technique or an existing antenna transmission technique in order to extend signaling to include new information about an additional modulation technique or the use of an additional antenna transmission technique without having to increase the number of bits transmitted in the signaling; and one or more modules configured for conveying the new information in unused combinations of the encoded bits, in accordance with some embodiments of the present invention and consistent with that described herein.

Alternatively, the user equipment or terminal may feature one or more modules configured for receiving jointly encoded bits containing information about an existing modulation technique or an existing antenna transmission technique in order to extend signaling to include new information about an additional modulation technique or the use of an additional antenna transmission technique without having to increase the number of bits transmitted in the signaling; and one or more modules configured for interpreting the new information in unused combinations of the encoded bits, in accordance with some embodiments of the present invention and consistent with that described herein.

The system would have such a network node B and/or such user equipment for cooperating in such a manner in accordance with some embodiments of the invention and consistent with that described herein.

Embodiments of the invention may also take the form of a computer program product with a program code, which program code is stored on a machine readable carrier or memory, for carrying out such functionality, when the computer program is run in a processor or control module of such a network node B or user equipment.

The scope of the invention is also intended to include a device, including chip hardware, comprising one or more integrated circuits for performing such functionality. The device may take the form of an application specific integrated circuit (ASIC) for performing the functionality thereof. For example, the chip hardware may form part of the terminal or the network node that forms part of the serving cell.

It should be understood that, unless stated otherwise herein, any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the scope of the present invention.

We claim:

1. A method comprising:
in a first case, sending a first part of a first control message and thereafter sending a first transmission using a first modulation, wherein the first part of the first control message comprises:
a modulation indicator that indicates the first modulation and a first channelization code set indicator that indicates channelization codes for the first transmission; and
in a second case, sending a first part of a second control message and thereafter sending a second transmission using a second modulation, wherein the first part of the second control message comprises:
a modulation indicator that indicates other than the first modulation;

another modulation indicator that specifically indicates the second modulation; and a second channelization code set indicator that indicates channelization codes for the second transmission;

wherein the second channelization code set indicator is shorter than the first channelization code set indicator by the size of the another modulation indicator.

2. The method of claim 1, wherein the first part of the first control message and the first part of the second control message are of equal lengths.

3. The method of claim 1, wherein the first modulation is QPSK and the other than the first modulation is QAM and the another modulation indicator selects between 16QAM and 64QAM.

4. The method of claim 3, further comprising in a third case sending a first part of a third control message and thereafter sending a third transmission using 16QAM modulation to a user equipment that is not enabled for 64QAM, wherein the first part of the third control message comprises:
a modulation indicator that indicates other than the first modulation scheme; and
a third channelization code set indicator that indicates channelization codes for the third transmission, wherein the third channelization code set indicator is the same length as the first channelization code set indicator.

5. The method of claim 4, wherein:
for the first case if the intended recipient of the first, second and third transmission is or is not enabled for 64QAM and the first modulation scheme is QPSK then the first transmission is sent with QPSK modulation and the first channelization code set is seven bits;
for the third case if the intended recipient of the first, second and third transmission is not enabled for 64QAM and the third modulation scheme is QAM then the third transmission is sent with 16QAM modulation and the third channelization code set is seven bits;
for the second case if the intended recipient of the first, second and third transmission is enabled for 64QAM and the second modulation scheme is QAM and the additional modulation scheme is 16QAM then the second transmission is sent with 16QAM modulation and the second channelization code set is six bits; and
for the second case if the intended recipient of the first, second and third transmission is enabled for 64QAM and the second modulation scheme is QAM and the additional modulation scheme is 64QAM then the second transmission is sent with 64QAM modulation and the second channelization code set is six bits.

6. The method of claim 1, wherein each of the modulation indicators is one bit, the first channelization code set indicator is seven bits, and the second channelization code set indicator is six bits.

7. The method of claim 6, wherein for the second case the second channelization code set indicator is shortened by a least significant bit to make room in the first part of the second control message for the another modulation indicator.

8. The method of claim 1, wherein the first part of each of the control messages is sent on a high speed shared control channel and the first and second channelization code indicators are for a high speed physical downlink shared channel over which the respective first and second transmissions are sent.

9. A memory embodying a program of machine-readable instructions executable by a digital data processor to perform actions directed toward specifying adaptive modulation for transmission, the actions comprising:
in a first case, sending a first part of a first control message and thereafter sending a first transmission using a first modulation, wherein the first part of the first control message comprises:
a modulation indicator that indicates the first modulation and a first channelization code set indicator that indicates channelization codes for the first transmission; and
in a second case, sending a first part of a second control message and thereafter sending a second transmission using a second modulation, wherein the first part of the second control message comprises:
a modulation indicator that indicates other than the first modulation;
another modulation indicator that specifically indicates a second modulation; and
a second channelization code set indicator that indicates channelization codes for the second transmission;
wherein the second channelization code set indicator is shorter than the first channelization code set indicator by the size of the another modulation indicator.

10. The memory of claim 9, wherein the first modulation is QPSK and the other than the first modulation is QAM and the another modulation indicator selects between 16QAM and 64QAM.

11. The memory of claim 10, the actions further comprising in a third case sending a first part of a third control message and thereafter sending a third transmission using 16QAM modulation to a user equipment that is not enabled for 64QAM, wherein the first part of the third control message comprises:
a modulation indicator that indicates other than the first modulation; and
a third channelization code set indicator that indicates channelization codes for the third transmission, wherein the third channelization code set indicator is the same length as the first channelization code set indicator.

12. The memory of claim 9, wherein each of the modulation indicators is one bit, the first channelization code set indicator is seven bits, and the second channelization code set indicator is six bits.

13. The memory of claim 12, wherein for the second case the actions include shortening the second channelization code set indicator by a least significant bit to make room in the first part of the second control message for the another modulation indicator.

14. An apparatus comprising:
a transmitter and a modulator coupled to a processor such that:
in a first case, the transmitter is adapted to send a first part of a first control message and thereafter to modulate and send a first transmission using a first modulation, wherein the first part of the first control message comprises:
a modulation indicator that indicates the first modulation and a first channelization code set indicator that indicates channelization codes for the first transmission; and
in a second case, the transmitter is adapted to send a first part of a second control message and thereafter to modulate and send a second transmission using a second modulation, wherein the first part of the second control message comprises:

a modulation indicator that indicates other than the first modulation;

another modulation indicator that specifically indicates the second modulation; and a second channelization code set indicator that indicates channelization codes for the second transmission;

wherein the second channelization code set indicator is shorter than the first channelization code set indicator by the size of the another modulation indicator.

15. The apparatus of claim 14, wherein the first part of the first control message and the first part of the second control message are of equal lengths.

16. The apparatus of claim 14, wherein the first modulation is QPSK and other than the first modulation is QAM and the another modulation indicator selects between 16QAM and 64QAM.

17. The apparatus of claim 16, wherein for a third case the transmitter is adapted to send a first part of a third control message and thereafter to modulate and send a third transmission using 16QAM modulation to a user equipment that is not enabled for 64QAM, wherein the first part of the third control message comprises:

a modulation indicator that indicates other than the first modulation; and a third channelization code set indicator that indicates channelization codes for the third transmission, wherein the third channelization code set indicator is the same length as the first channelization code set indicator.

18. The apparatus of claim 17, further comprising a memory storing the table or an algorithm for generating the table that is referenced in adapting the apparatus as said in claim 17, in which:

for the first case if the intended recipient of the first, second and third transmission is or is not enabled for 64QAM and the first modulation scheme is QPSK then the first transmission is sent with QPSK modulation and the first channelization code set is seven bits;

for the third case if the intended recipient of the first, second and third transmission is not enabled for 64QAM and the third modulation scheme is QAM then the third transmission is sent with 16QAM modulation and the third channelization code set is seven bits;

for the second case if the intended recipient of the first, second and third transmission is enabled for 64QAM and the second modulation scheme is QAM and the additional modulation scheme is 16QAM then the second transmission is sent with 16QAM modulation and the second channelization code set is six bits; and for the second case if the intended recipient of the first, second and third transmission is enabled for 64QAM and the second modulation scheme is QAM and the additional modulation scheme is 64QAM then the second transmission is sent with 64QAM modulation and the second channelization code set is six bits.

19. The apparatus of claim 14, wherein each of the modulation indicators is one bit, the first channelization code set indicator is seven bits, and the second channelization code set indicator is six bits.

20. The apparatus of claim 19, wherein for the second case the processor shortens the second channelization code set indicator by a least significant bit to make room in the first part of the second control message for the another modulation indicator.

21. The apparatus of claim 14, wherein the apparatus comprises a Node B of a high speed packet access system network.

22. The apparatus of claim 14, wherein the transmitter sends the first part of each of the control messages on a high speed shared control channel, and the first and second channelization code indicators are for a high speed physical downlink shared channel over which the transmitter sends the respective first and second transmissions.

23. The apparatus of claim 14, wherein the apparatus comprises an integrated circuit.

24. An apparatus comprising:

means for arranging a control message according to a first case and according to a second case, and means for sending the control message, wherein for the first case, the means for arranging and the means for sending are for sending a first part of a first control message and thereafter for sending a first transmission using a first modulation, wherein the first part of the first control message comprises:

a modulation indicator that indicates the first modulation and a first channelization code set indicator that indicates channelization codes for the first transmission; and wherein for the second case, the means for arranging and the means for sending are for sending a first part of a second control message and thereafter for sending a second transmission using a second modulation, wherein the first part of the second control message comprises:

a modulation indicator that indicates other than the first modulation;

another modulation indicator that specifically indicates the second modulation; and a second channelization code set indicator that indicates channelization codes for the second transmission;

wherein the second channelization code set indicator is shorter than the first channelization code set indicator by the size of the another modulation indicator.

25. The apparatus of claim 24, wherein the means for arranging comprises a digital processor and the means for sending comprises a transmitter;

wherein the first modulation is QPSK and other than the first modulation is QAM and the another modulation scheme indicator selects between 16QAM and 64QAM; and wherein each of the modulation indicators is one bit, the first channelization code set indicator is seven bits and for the second case the means for arranging shortens the second channelization code set indicator by a least significant bit to six bits to make room in the first part of the second control message for the another modulation indicator.

26. A method comprising:

in a first case, determining a first modulation from a modulation indicator of a first part of a received first control message and determining channelization codes for a first transmission from a first channelization code set indicator of the first part of the first control message;

demodulating the received first transmission according to the determined first modulation;

in a second case, determining other than the first modulation from a modulation indicator of a first part of a received second control message;

determining a specific second modulation that is other than the first modulation from another modulation indicator of the first part of the second control message;

determining channelization codes for a second transmission from a second channelization code set indicator of the first part of the second control message; and demodulating the received second transmission according to the determined specific second modulation, wherein the second channelization code set indicator is shorter than the first channelization code set indicator by the size of the another modulation indicator.

27. The method of claim 26, wherein the first part of the first control message and the first part of the second control message are of equal lengths.

28. The method of claim 26, wherein the first modulation is QPSK and the other than the first modulation is QAM and the another modulation indicator selects between 16QAM and 64QAM.

29. The method of claim 28, wherein:

for the first case if the intended recipient of the first, second and third transmission is or is not enabled for 64QAM and the first modulation scheme is QPSK then the first transmission is sent with QPSK modulation and the first channelization code set is seven bits;

for the third case if the intended recipient of the first, second and third transmission is not enabled for 64QAM and the third modulation scheme is QAM then the third transmission is sent with 16QAM modulation and the third channelization code set is seven bits;

for the second case if the intended recipient of the first, second and third transmission is enabled for 64QAM and the second modulation scheme is QAM and the additional modulation scheme is 16QAM then the second transmission is sent with 16QAM modulation and the second channelization code set is six bits; and for the second case if the intended recipient of the first, second and third transmission is enabled for 64QAM and the second modulation scheme is QAM and the additional modulation scheme is 64QAM then the second transmission is sent with 64QAM modulation and the second channelization code set is six bits.

30. The method of claim 26, wherein each of the modulation indicators is one bit, the first channelization code set indicator is seven bits, and the second channelization code set indicator is six bits.

31. The method of claim 30, wherein for the second case the second channelization code set indicator is shorter by a least significant bit and in its place is the another modulation indicator of the first part of the second control message.

32. The method of claim 26, wherein the first part of each of the control messages is received on a high speed shared control channel and the first and second channelization code indicators are for a high speed physical downlink shared channel over which the respective first and second transmissions are received.

33. A memory embodying a program of machine-readable instructions executable by a digital data processor to perform actions directed toward specifying adaptive modulation for transmission, the actions comprising:

in a first case, determining a first modulation from a modulation indicator of a first part of a received first control message and determining channelization codes for a first transmission from a first channelization code set indicator of the first part of the first control message;

demodulating the received first transmission according to the determined first modulation;

in a second case, determining other than the first modulation from a modulation indicator of a first part of a received second control message;

determining a specific second modulation that is other than the first modulation from another modulation indicator of the first part of the second control message;

determining channelization codes for a second transmission from a second channelization code set indicator of the first part of the second control message; and demodulating the received second transmission according to the determined specific second modulation, wherein the second channelization code set indicator is shorter than the first channelization code set indicator by the size of the another modulation indicator.

34. The memory of claim 33, wherein the first modulation is QPSK and the other than the first modulation is QAM and the another modulation indicator selects between 16QAM and 64QAM.

35. The memory of claim 33, wherein each of the modulation indicators is one bit, the first channelization code set indicator is seven bits, and the second channelization code set indicator is six bits.

36. The memory of claim 35, wherein for the second case the second channelization code set indicator is shorter by a least significant bit and in its place is the another modulation indicator of the first part of the second control message.

37. The memory of claim 33, wherein the first part of each of the control messages is received on a high speed shared control channel and the first and second channelization code indicators are for a high speed physical downlink shared channel over which the respective first and second transmissions are received.

38. An apparatus comprising a receiver coupled to a processor and adapted:

in a first case to determine a first modulation from a modulation indicator of a first part of a received first control message and to determine channelization codes for a first transmission from a first channelization code set indicator of the first part of the first control message;

to demodulate the received first transmission according to the determined first modulation;

and adapted in a second case to determine other than the first modulation scheme from a modulation indicator of a first part of a received second control message;

to determine a specific second modulation that is other than the first modulation from another modulation indicator of the first part of the second control message;

to determine channelization codes for a second transmission from a second channelization code set indicator of the first part of the second control message; and to demodulate the received second transmission according to the determined specific second modulation, wherein the second channelization code set indicator is shorter than the first channelization code set indicator by the size of the another modulation indicator.

39. The apparatus of claim 38, wherein the first part of the first control message and the first part of the second control message are of equal lengths.

40. The apparatus of claim 38, wherein the first modulation is QPSK and other than the first modulation is QAM and the another modulation indicator selects between 16QAM and 64QAM.

41. The apparatus of claim 40, wherein:

for the first case if the intended recipient of the first, second and third transmission is or is not enabled for 64QAM and the first modulation scheme is QPSK then the first transmission is sent with QPSK modulation and the first channelization code set is seven bits;

for the third case if the intended recipient of the first, second and third transmission is not enabled for 64QAM and the third modulation scheme is QAM then the third transmission is sent with 16QAM modulation and the third channelization code set is seven bits;

for the second case if the intended recipient of the first, second and third transmission is enabled for 64QAM and the second modulation scheme is QAM and the additional modulation scheme is 16QAM then the second transmission is sent with 16QAM modulation and the second channelization code set is six bits; and for the second case if the intended recipient of the first, second and third transmission is enabled for 64QAM and the second modulation scheme is QAM and the additional modulation scheme is 64QAM then the second transmission is sent with 64QAM modulation and the second channelization code set is six bits.

42. The apparatus of claim 38, wherein each of the modulation indicators is one bit, the first channelization code set indicator is seven bits, and the second channelization code set indicator is six bits.

43. The apparatus of claim 42, wherein for the second case the second channelization code set indicator is shorter by a least significant bit and in its place is the another modulation indicator of the first part of the second control message.

44. The apparatus of claim 38, wherein the apparatus comprises a user equipment operating in a high speed packet access system network.

45. The apparatus of claim 38, wherein the first part of each of the control messages is received on a high speed shared control channel and the first and second channelization code indicators are for a high speed physical downlink shared channel over which the respective first and second transmissions are received.

46. The apparatus of claim 38, wherein the apparatus comprises an integrated circuit.

47. An apparatus comprising means for receiving coupled to processing means and adapted:

in a first case for determining a first modulation from a modulation indicator of a first part of a received first control message and for determining channelization codes for a first transmission from a first channelization code set indicator of the first part of the first control message;

for demodulating the received first transmission according to the determined first modulation;

and adapted in a second case for determining other than the first modulation from a modulation indicator of a first part of a received second control message;

for determining a specific second modulation that is other than the first modulation from another modulation indicator of the first part of the second control message;

for determining channelization codes for a second transmission from a second channelization code set indicator of the first part of the second control message; and for demodulating the received second transmission according to the determined specific second modulation, wherein the second channelization code set indicator is shorter than the first channelization code set indicator by the size of the another modulation indicator.

48. The apparatus of claim 47, wherein the receiving means comprises a receiver, the processing means comprises a processor, and further wherein the first part of the first control message and the first part of the second control message are of equal lengths, the first modulation is QPSK and other than the first modulation is QAM and the another modulation indicator selects between 16QAM and 64QAM.

* * * * *